United States Patent
O'Rourke et al.

(10) Patent No.: US 7,191,235 B1
(45) Date of Patent: Mar. 13, 2007

(54) SYSTEM AND METHOD FOR COMMUNICATING DATA IN A LOADBALANCING ENVIRONMENT

(75) Inventors: Chris O'Rourke, Apex, NC (US); Ashish A. Chandwadkar, Morrisville, NC (US)

(73) Assignee: Cisco Technology, Inc., San Jose, CA (US)

( * ) Notice: Subject to any disclaimer, the term of this patent is extended or adjusted under 35 U.S.C. 154(b) by 716 days.

(21) Appl. No.: 10/305,466

(22) Filed: Nov. 26, 2002

(51) Int. Cl.
*G06F 15/16* (2006.01)

(52) U.S. Cl. ............... 709/227; 709/228; 709/229; 709/238; 718/105

(58) Field of Classification Search ........ 709/227–229, 709/250, 243; 718/105
See application file for complete search history.

(56) References Cited

U.S. PATENT DOCUMENTS

| | | | |
|---|---|---|---|
| 6,393,458 B1 | 5/2002 | Gigliotti et al. ............ 709/203 |
| 6,434,618 B1 | 8/2002 | Cohen et al. ............... 709/228 |
| 6,442,165 B1 | 8/2002 | Sitaraman et al. ........ 370/395.4 |
| 6,473,802 B2 | 10/2002 | Masters ..................... 709/229 |
| 6,484,143 B1 | 11/2002 | Swildens et al. .............. 705/1 |
| 6,993,360 B2 * | 1/2006 | Plahte et al. ................ 455/555 |
| 2002/0138618 A1 * | 9/2002 | Szabo ........................ 709/225 |
| 2003/0030866 A1 * | 2/2003 | Yoo ........................... 359/128 |
| 2003/0076803 A1 * | 4/2003 | Chuah ........................ 370/338 |
| 2005/0260982 A1 * | 11/2005 | Ko et al. .................... 455/423 |

\* cited by examiner

*Primary Examiner*—Rupal Dharia
*Assistant Examiner*—Nghi V. Tran
(74) *Attorney, Agent, or Firm*—Baker Botts L.L.P.

(57) ABSTRACT

A method for communicating data in a network environment is provided that includes receiving a request from an end user for a communications link, the request being used to initiate a communication session. A response is then received that is communicated to the end user in order to establish the communication session, the response being generated by a network node that was selected as a result of a loadbalancing decision. Port-level filtering for the communication session may then be invoked after the response such that separate data and signal pathways are established for selected information associated with the communication session.

20 Claims, 2 Drawing Sheets

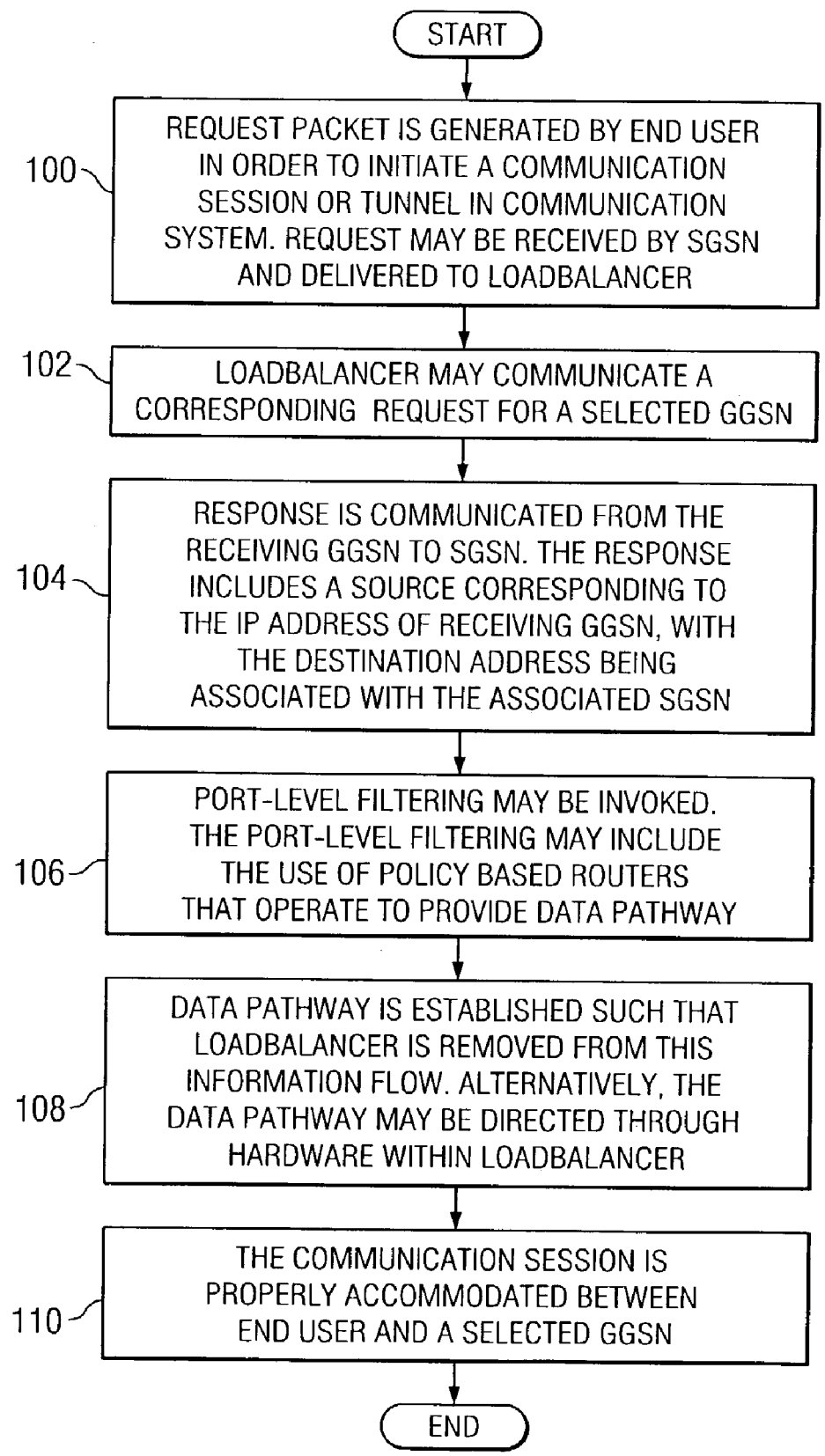

SYSTEM AND METHOD FOR COMMUNICATING DATA IN A LOADBALANCING ENVIRONMENT

TECHNICAL FIELD OF THE INVENTION

This invention relates in general to the field of communications and more particularly to a system and method for communicating data in a loadbalancing environment.

BACKGROUND OF THE INVENTION

Networking architectures have grown increasingly complex in communications environments. In addition, the augmentation of clients or end users wishing to communicate in a network environment has caused many networking configurations and systems to respond by adding elements to accommodate the increase in networking traffic. Communication tunnels may be used in order to establish or to gain access to a network whereby an end user or an object may initiate a tunneling protocol by invoking a selected location or a network node. The network node or central location may then provide a platform that the end user may use to conduct a communication session.

As the subscriber base of end users increases, proper routing and efficient management of communication sessions and data flows become even more critical. Several components are generally implicated in such a configuration and, in certain instances, many of these components are unreasonably delegated a disproportionate number of duties. This overburdening may decrease throughput and inhibit the flow of network traffic, causing congestion or bottlenecks in the system. Additionally, the overwhelming burden on a single element in the communications flow may decrease bandwidth capabilities as the overtaxed component is forced to work its way through each of its tasks and duties before being able to accommodate additional communications tunnels or end users.

SUMMARY OF THE INVENTION

From the foregoing, it may be appreciated by those skilled in the art that a need has arisen for an improved communications approach that provides for a reduction in the burden placed on a loadbalancer associated with communications between two end points or nodes. In accordance with one embodiment of the present invention, a system and method for communicating data in a network environment are provided that greatly reduce disadvantages and problems associated with conventional loadbalancing techniques.

According to one embodiment of the present invention, there is provided a method for communicating data in a network environment that includes receiving a request from an end user for a communications link to initiate a communication session. A response is then communicated to the end user in order to establish the communication session. The response is generated by a network node that was selected as a result of a loadbalancing decision. Port-level filtering for the communication session may then be invoked after the response such that separate data and signal pathways are established for selected information associated with the communication session.

Certain embodiments of the present invention may provide a number of technical advantages. For example, according to one embodiment of the present invention a communications approach is provided that allows a loadbalancer to only be actively involved in the initiation of a communication session. This reduction in responsibility for the loadbalancer operates to increase throughput as two points or nodes may efficiently communicate directly instead of having to direct all information through the loadbalancer for processing. This may further reduce the number of central processing unit (CPU) cycles that may be intensive and require additional work to be performed by the loadbalancer. Accordingly, the loadbalancer may be relegated to simple information transfer involving signaling and not be positioned in the path of data communications in order to inspect or evaluate information. The removal of the loadbalancer from the data transfer interaction between two nodes may further alleviate responsibilities designated for the loadbalancer such that greater bandwidth may be accommodated for in the network.

Yet another technical advantage of one embodiment of the present invention is also a result of the routing of data around the loadbalancer. The decreased reliance on the loadbalancer operates to better allocate network resources because per-tunnel state information is no longer needed to be maintained by the loadbalancer. In addition, the decreased dependency on the loadbalancer allows for improved failover characteristics such that, if the loadbalancer would become dysfunctional or non-operational, associated communication sessions may not necessarily be lost. Furthermore, redundancy problems are less challenging because of the reduction in duties assigned to the loadbalancer.

Still another technical advantage of one embodiment of the present invention relates to the configuration for communicating data in a loadbalancing environment. The configuration employed is simplified in accordance with the teachings of the present invention. This is a result of a signaling protocol being established in one location and a data exchange transfer being established in another location. The bifurcation of these two segments enhances data traffic management capabilities and further offers increased scalability as a result of the decreased processing responsibilities relegated to the loadbalancer. Certain embodiments of the present invention may enjoy some, all, or none of these advantages. Other technical advantages may be readily apparent to one skilled in the art from the following figures, description, and claims.

BRIEF DESCRIPTION OF THE DRAWINGS

To provide a more complete understanding of the present invention and features and advantages thereof, reference is made to the following description, taken in conjunction with the accompanying figures, wherein like reference numerals represent like parts, in which:

FIG. 3 is a flowchart illustrating a series of example steps associated with a method for communicating data in a loadbalancing environment.

DETAILED DESCRIPTION OF THE INVENTION

Figure 1:
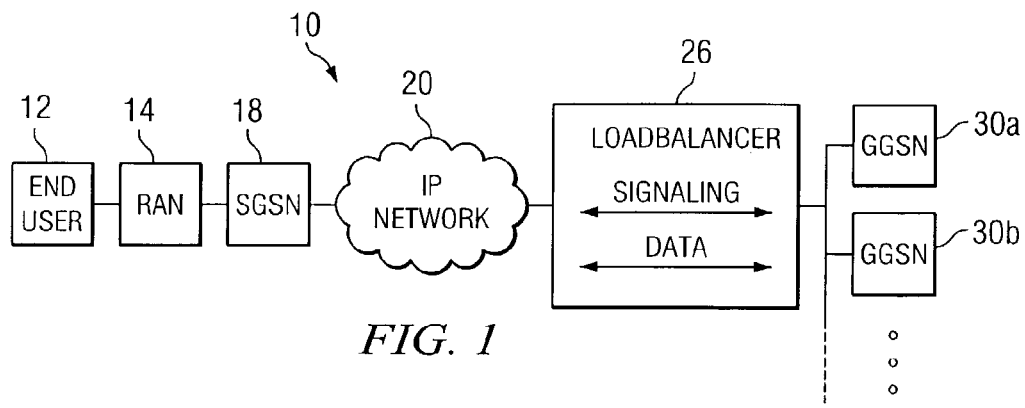
FIG. 1 is a simplified block diagram of a communications system for communicating data in a loadbalancing environment in accordance with one embodiment of the present invention.

FIG. 1 is a simplified block diagram of a communication system 10 for communicating data in a network environment. Communication system 10 includes an end user 12, a radio access network (RAN) 14, a serving general packet radio service (GPRS) support node (SGSN) 18, and an internet protocol (IP) network 20. Additionally, communication system 10 includes a loadbalancer 26 and multiple gateway GPRS support nodes (GGSNs) 30a–b. FIG. 1 may be generally configured or arranged to represent a 2.5 G communication architecture applicable to a Global System for Mobile (GSM) environment in accordance with a particular embodiment of the present invention. However, the 2.5 G architecture is offered for purposes of example only and may alternatively be substituted with any suitable networking protocol or arrangement that provides a communicative platform for communication system 10. For example, communication system 10 may cooperate with any version of a GPRS tunneling protocol (GTP) that includes different ports for data and signaling. This may also be inclusive of 3 G architectures that provide similar distinguishing features for data and signaling.

In accordance with the teachings of the present invention, communication system 10 operates to alleviate the responsibilities associated with loadbalancer 26 in providing optimal communications between end user 12 and selected GGSNs 30a–b. Two stages generally exist in communications flows that involve end user 12. A first stage relates generally to initiation (or signaling), whereby a communication session may be prompted by end user 12. A second stage relates generally to the establishment of the communication session or link with corresponding data transfer or information exchange. The initiation stage of the communication session generally requires an invocation of loadbalancer 26. During this stage, a create request from end user 12 and a suitable response generated by a designated GGSN 30a–b may be communicated within communication system 10.

After the communication session is initiated, loadbalancer 26 may be removed from the communications pathway allowing for a more direct data transfer between end user 12 and a selected GGSN 30a–b. This may be accommodated via IP network 20. Thus, loadbalancer 26 operates to be only directly involved in initiation of the communication session to operate as a request broker for the establishment of one or more communication tunnels. After the establishment of the tunnels, the data is effectively handed off such that the signaling information is required to propagate through one portion of loadbalancer 26 and data through another. This is accomplished in conjunction with port-level filtering for GPRS data and signaling.

The alleviation of responsibilities or duties that are delegated to loadbalancer 26 may be accomplished in several ways. For example, FIG. 1 illustrates one example in which loadbalancer 26 may include suitable hardware and/or software for distinctly or separately managing a signaling pathway and a data pathway. Thus, software may be used within loadbalancer 26 to facilitate the propagation of signaling data between end user 12 and a selected GGSN 30a–b. Hardware, particularly a component within a loadbalancing switch of loadbalancer 26, may be implemented in order to facilitate data exchanges between end user 12 and a selected GGSN 30a–b. This separation of signaling decreases the burden on loadbalancer 26 and further simplifies the configuration offered by communication system 10. In an alternative embodiment, this separation of signaling and data may be accomplished using specific routing elements or policy management units. Such an architecture is described in detail below with reference to FIG. 2A.

The initiation and establishment protocol implemented in communication system 10 operates to provide a significant reduction in communications traffic for loadbalancer 26. As a result, loadbalancer 26 may offer increased throughput and decreased reliance on a central location. This feature may further provide the opportunity for loadbalancer 26 to be isolated from excessive central processing unit (CPU) cycles that may be intensive and require substantial work to be performed by loadbalancer 26. This technique may also allow loadbalancer 26 to participate in only simple information transfers or data packet switching without requiring loadbalancer 26 to modify addressing information or to process specific data passing through loadbalancer 26. Loadbalancer 26 may also avoid various types of GTP header inspections, which would otherwise significantly slow loadbalancing operations. With the reduced responsibilities of loadbalancer 26, communication system 10 provides an architecture that is able to accommodate greater bandwidth and allow for enhanced and more efficient communications.

End user 12 may be a client or a customer wishing to initiate a communication in communication system 10 via IP network 20. End user 12 may be inclusive of devices used to initiate a communication, such as a computer, a personal digital assistant (PDA), a laptop or electronic notebook, a telephone, a mobile station, or any other device, component, element, or object capable of initiating voice or data exchanges within communication system 10. End user 12 may also be inclusive of a suitable interface to the human user, such as a microphone, a display, a keyboard, or other terminal equipment (such as for example an interface to a personal computer or to a facsimile machine in cases where end user 12 is used as a modem). End user 12 may also be any device that seeks to initiate a communication on behalf of another entity or element, such as a program, a database, or any other component, device, element, or object capable of initiating a voice or a data exchange within communication system 10. Data, as used herein in this document, refers to any type of numeric, voice, or script data, or any type of source or object code, or any other suitable information in any appropriate format that may be communicated from one point to another.

RAN 14 is a communications interface between end user 12 and SGSN 18. RAN 14 may comprise a base transceiver station and a base station controller. The communications interface provided by RAN 14 allows data to be exchanged between end user 12 and any number of selected elements within communication system 10. RAN 14 facilitates the delivery of a request packet generated by end user 12 and the reception of information sought by end user 12. RAN 14 is only one example of a communications interface between end user 12 and SGSN 18. Other types of communications interfaces may be used for a desired network design.

IP network 20 represents a series of points or nodes of interconnected communication paths for receiving and transmitting packets of information that propagate through communication system 10. IP network 20 offers a communicative interface between end user 12 and selected GGSNs 30a–b and may be any local area network (LAN), wireless local area network (WLAN), metropolitan area network (MAN), wide area network (WAN), or any other appropriate architecture or system that facilitates communications in a network environment. IP network 20 implements a user datagram protocol (UDP)/internet protocol (UDP/IP) communication language protocol in a particular embodiment of the present invention. However IP network 20 may alternatively implement any other suitable communication protocol for transmitting and receiving data packets within communication system 10.

SGSN 18 and GGSNs 30a–b cooperate in order to facilitate a communication session involving end user 12. GGSNs 30a–b are communications nodes operating in a GPRS environment that may be working in conjunction with multiple SGSNs 18 to provide a communications medium in a GPRS service network environment in communicating high-speed data exchanges within communication system 10. GGSN 30a may be inclusive of a walled garden (used as an environment to control user access to web content or services) or any other suitable mechanism that a network operator may choose to implement in providing some connectivity for the network. GPRS represents a packet-based data bearer service for communication services that may be delivered as a network overlay for any type of suitable network configuration or platform. GPRS generally applies packet-radio and packet switching principles to transfer data packets in an efficient way between GSM elements or units and external packet data networks. Packet switching occurs when data is split into packets that are transmitted separately and then reassembled at a receiving end. GPRS may support multiple internet communication protocols and may enable existing IP, X.25, or any other suitable applications or platforms to operate over GSM connections.

Loadbalancer 26 is an element or a device that receives requests and then distributes those requests to the next available server or node. The available server or node may be any computer or device on a network that manages network resources or that processes data. Such loadbalancing decisions may be executed based on suitable algorithms or software provided in loadbalancer 26. Loadbalancer 26 may also include hardware and software for directing signaling and data information in communication system 10. Hardware within a switch fabric of loadbalancer 26 may operate to direct information based on IP address data provided in the communication flows. Software within loadbalancer 26 may properly accommodate a signaling pathway for transmissions associated with end user 12 and selected GGSNs 30a–b. Alternatively, this assignment of software and hardware may be switched with software accommodating the data exchange and signaling being managed through hardware where appropriate and according to particular needs.

Loadbalancer 26 may also perform other suitable loadbalancing tasks, such as dividing of the amount of work that an element has to do between two or more elements to ensure more work gets done in the same amount of time and, in general, end users 12 may be served more quickly. Loadbalancer 26 may include any appropriate hardware, software, (or a combination of both) or any appropriate component, device, element, or object that suitably manages information traffic in a network environment. Additionally, any of the operations of SGSN 18 or GGSNs 30a–b may be assisted by loadbalancer 26 where appropriate and in accordance with particular needs.

In operation, loadbalancer 26 may execute loadbalancing decisions for selected GGSNs 30a–b. End user 12 may connect to a virtual IP address that translates to the back end IP address of loadbalancer 26. The virtual IP address represents an arbitrary number that may be assigned or provisioned to loadbalancer 26. When traffic comes from loadbalancer 26, it may be translated back appropriately and sent to its proper destination. In accordance with the teachings of the present invention, the communications flow from a selected GGSN 30a–b to loadbalancer 26 may be suitably transformed such that the destination address and corresponding tunnel end point identifier (TEID) are properly manipulated in order to effectuate port-level filtering. The TEID reflects a communication tunnel to be used during the communication session initiated by end user 12.

Figure 2A:
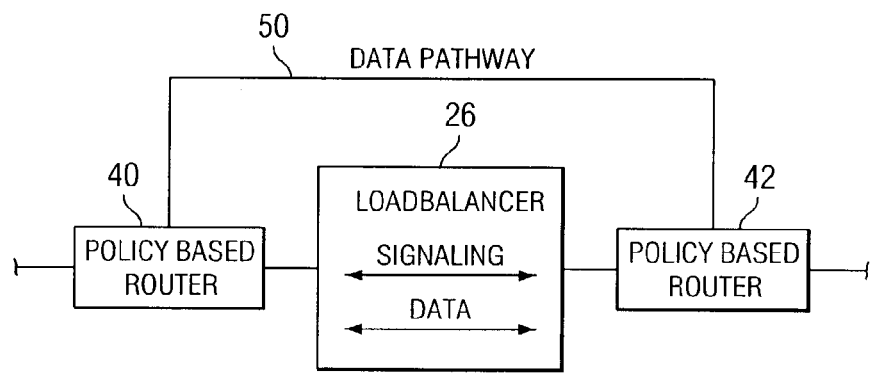
FIG. 2A is a simplified block diagram of an alternative embodiment of the communication system.

FIG. 2A is a simplified block diagram illustrating an alternative embodiment of communication system 10. A set of policy based routers 40 and 42 may be coupled to loadbalancer 26 in order effectuate port-level filtering in accordance with the teachings of the present invention. Although illustrated as external to loadbalancer 26, policy based routers 40 and 42 may be included therein. Policy based routers 40 and 42 operate to facilitate a data pathway 50 that propagates information between end user 12 and selected GGSNs 30a–b. Thus, policy based routers 40 and 42 may operate to provide a protocol that alleviates traffic and responsibilities associated with loadbalancer 26 in order to properly accommodate data in communication system 10. Signaling information may still propagate through loadbalancer 26, particularly through the software included therein in an example embodiment. However, data propagates along data pathway 50 in conjunction with policy based routers 40 and 42 in order to remove loadbalancer 26 from the data stream for the corresponding communication session.

With respect to data pathway 50, data may propagate from SGSN 18 to selected GGSNs 30a–b. The source IP is still the selected GGSN 30a–b. The destination address may correspond to the selected GGSN 30a–b. Now the destination port is equal to 2152 because the propagating segment is associated with data. Policy based routers 40 and 42 may now send that information along the alternative path through data pathway 50. Communications in the other direction operate in a similar manner except that such communications may key on the source port instead of the destination port. Thus, a bypassing mechanism is provided to loadbalancer 26 for a substantial part of the communication session. After the initial change in address, port-level filtering is then executed in order to effectuate management of information flows.

Loadbalancer 26 may inspect the communication flow between GGSN 30a or 30b that is communicated to SGSN 18 but not necessarily change it. Loadbalancer 26 is aware of all signaling flows at this stage in the protocol and the communication tunnel is now established and functional. Both SGSN 18 and a selected GGSN 30a or 30b are aware of the communication tunnel. Thus, the protocol implemented allows for an execution of a handoff. It further allows an easy manipulation (i.e. not requiring significant processing) in the end point address from the virtual to the real address.

Policy based routers 40 and 42 may be configured such that if the destination port equals 2123, information is routed to signaling associated with loadbalancer 26 corresponding to the source port being 2123. Where the destination port equals 2152, the source port may be equal to 2152. This represents the data pathway. Such port and source number numbering represent industry standard designations corresponding to signaling and data transmissions.

Generally, in the response to the request received by a selected GGSN 30a–b, the GGSN IP address may be manipulated appropriately in accordance with the teachings of the present invention. Hardware filters or any other suitable element may then be used to direct only the signaling traffic through software flow paths. Data may flow through the hardware or, in a specific embodiment, a component of the loadbalancing switch fabric that switches IP packets based on looking at only the corresponding IP information. The switch fabric may be a layer 3 switch fabric in a particular embodiment or any other suitable type of switch fabric in accordance with particular needs.

The removal of loadbalancer 26 from the data flow allows GGSNs 30a–b to provide for a greater subscriber base of end users 12. This may also allow for enhanced scalability and redundancy properties for communication system 10 both within and external to a cluster of communications. As a result, communications system 10 provides for increased bandwidth, simplification of communications management, and enhanced communication speeds associated with network communications. Additional details associated with the operation of communication system 10 are provided below with reference to FIG. 2B.

Figure 2B:
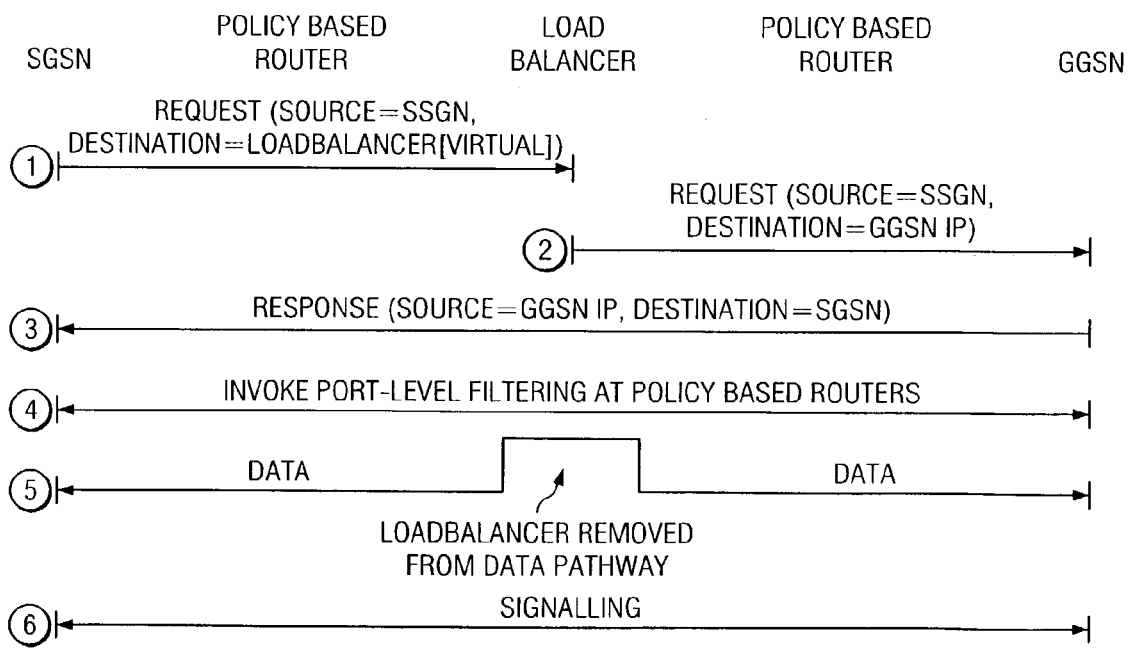
FIG. 2B is a simplified timing diagram illustrating interaction between multiple elements included in the communication system.

FIG. 2B is a simplified timing diagram illustrating an example interaction between elements included within communication system 10. The timing diagram begins at step 1, where a request is generated by SGSN 18 and communicated to loadbalancer 26. This is the initial create request that is initiated by end user 12 and delivered to loadbalancer 26, whereby the source is equal to SGSN 18 and the destination is equal to the virtual address of loadbalancer 26.

At step 2, the request may be communicated from loadbalancer 26 to a selected GGSN 30a–b. The selection of GGSN 30a or GGSN 30b may be based on a loadbalancing decision that is executed by loadbalancer 26. This decision may be based on algorithms implemented by loadbalancer 26 or any other appropriate parameter. The request is delivered from loadbalancer 26 to a selected GGSN 30a–b and includes a source address associated with the SGSN 18 and a destination corresponding to the IP address of the receiving GGSN 30a or 30b.

At step 3, a response is communicated by the receiving GGSN 30a or 30b and communicated to SGSN 18. The response includes a source that corresponds to the IP address of the receiving GGSN 30a or 30b, with the destination address being associated with SGSN 18. A selected address information element for a corresponding GSN may also properly be changed or otherwise manipulated. At step 4, port-level filtering may be invoked either internal to loadbalancer 26, as illustrated by the embodiment of FIG. 1, or external to loadbalancer 26 in conjunction with policy based routers 40 and 42 as illustrated in FIG. 2A.

Step 5 reflects the effect of port-level filtering on data pathway 50 in cooperation with loadbalancer 26. Loadbalancer 26 is effectively removed from data pathway 50 in order to reduce the burden placed thereon. Thus, data or information being communicated between end user 12 and a selected GGSN 30a–b does not necessarily have to implicate loadbalancer 26. It should be noted that step 5 of FIG. 2B illustrates the alternative embodiment of the present invention, whereby policy based routers 40 and 42 handle propagation of data along data pathway 50. Alternatively, loadbalancer 26 may include hardware and software operable to delineate between signaling information and data segments, such that signaling information is properly routed through the software included within loadbalancer 26 and data is properly routed through hardware included in loadbalancer 26. Additionally, this arrangement may be easily switched, whereby hardware is accommodating signaling and software is accommodating data flows.

Step 6 illustrates the signaling protocol for communications that may run through software included within loadbalancer 26. This signaling may be accommodated after the port-level filtering has been invoked. In either of the embodiments of FIG. 1 or FIG. 2A, signaling information may still propagate through loadbalancer 26. In alternative embodiments, a special signaling element or component may be provided that adequately processes signaling information such that the burden on loadbalancer 26 is further lessened.

FIG. 3 is a simplified flowchart illustrating a series of example steps associated with a method for communicating data in a network environment. The method begins at step 100 where a request packet is generated by end user 12 in order to initiate a communication session or tunnel in communication system 10. The request may be received by SGSN 18, communicated over IP network 20, and delivered to loadbalancer 26. At step 102, loadbalancer 26 may relay this request to a selected GGSN 30a–b. At step 104, a response is communicated from the receiving GGSN 30a or 30b to SGSN 18. The response includes a source that corresponds to the IP address of the receiving GGSN 30a or 30b with the destination address being associated with SGSN 18. Thus, in the response we are effectuating a change in the IP address of the selected GGSN 30a or 30b.

At step 106, port-level filtering may be invoked. The port-level filtering may include the use of policy based routers 40 and 42 that operate to provide data pathway 50 in communication system 10. Alternatively, hardware included within loadbalancer 26 may facilitate a suitable data pathway between end user 12 and a selected GGSN 30a–b. At step 108, data pathway 50 is established such that loadbalancer 26 is removed from the data flow. Alternatively, as described above, loadbalancer 26 may include software operable to receive the data flow with hardware included therein to accommodate for signaling information. At step 110, the communication session is properly accommodated between end user 12 and a selected GGSN 30a or 30b.

Some of the steps illustrated in FIG. 3 may be changed or deleted where appropriate and additional steps may also be added to the flowchart. These changes may be based on specific communication architectures or particular interfacing arrangements and configurations of associated elements and do not depart from the scope or the teachings of the present invention.

Although the present invention has been described in detail with reference to IP communications, communication system 10 may be used for any tunneling protocol involving a redirection or handoff of communications in a loadbalancing environment. Any suitable communications that involve the transitioning between an initialization state and a data transfer state may benefit from the teachings of the present invention. The use of end user 12 and IP communications have only been offered for purposes of teaching and should not be construed to limit the scope of the present invention in any way.

In addition, communication system 10 may be extended to any scenario in which end user 12 is provided with mobility (in the context of a wired or a wireless connection or coupling) and communicates with some type of access server (e.g. a network access server (NAS), foreign agents, etc.). End user 12 may use a dedicated connection of some form or use forms of multiple access protocols where appropriate. Access may be associated with point to point protocol (PPP) or alternatively with layer three protocols over an L2 layer in accordance with particular needs. Such an embodiment may include any suitable tunnel terminators and/or tunnel initiators that may be operable to communicate with loadbalancer 26.

Numerous other changes, substitutions, variations, alterations, and modifications may be ascertained by those skilled in the art and it is intended that the present invention encompass all such changes, substitutions, variations, alterations, and modifications as falling within the spirit and scope of the appended claims. Moreover, the present invention is not intended to be limited in any way by any statement in the specification that is not otherwise reflected in the appended claims.

What is claimed is:

1. An apparatus for communicating data in a network environment, comprising:
   a loadbalancer operable to receive a request from an end user for a communications link provided by a gateway support node and to pass a response to the end user in order to establish a communication session, wherein port-level filtering is invoked after the response is communicated to the end user such that separate data and signal pathways are established between the end user and the gateway support node, and wherein the loadbalancer is coupled to first and second policy based routers that are operable to facilitate propagation of information flowing through the data pathway such that the loadbalancer does not receive information propagating through the data pathway.

2. The apparatus of claim 1, further comprising:
   a serving support node operable to initiate one or more tunnels on behalf of the end user in order to establish the communication session.

3. The apparatus of claim 1, wherein a tunnel end point identifier (TEID) is assigned to the end user for the communication session, the TEID corresponding to a selected communication tunnel to be used during the communication session.

4. The apparatus of claim 1, wherein the request includes a virtual address provisioned to the loadbalancer and operable to route the request from the end user to the loadbalancer.

5. The apparatus of claim 1, wherein the loadbalancer includes a software element and a hardware element, the hardware element including a loadbalancing switch that switches internet protocol (IP) packets based on IP address information included therein, the software element facilitating propagation of signaling information via the signal pathway, and wherein the hardware element facilitates propagation of information propagating via the data pathway between the end user and the gateway support node.

6. The apparatus of claim 1, wherein the loadbalancer is further operable to change an end point address associated with a selected one of a plurality of gateway support nodes in order to execute a handoff associated with the end user.

7. A method for communicating data in a network environment, comprising:
   receiving a request from an end user for a communications link, the request being used to initiate a communication session;
   receiving a response communicated to the end user that may establish the communication session, the response being generated by a network node that was selected as a result of a loadbalancing decision;
   invoking port-level filtering for the communication session after the response such that separate data and signal pathways are established for selected information associated with the communication session; and
   using first and second policy based routers to facilitate propagation of information flowing through the data pathway such that an associated loadbalancer does not receive information propagating through the data pathway.

8. The method of claim 7, further comprising:
   initiating one or more tunnels on behalf of the end user in order to establish the communication session.

9. The method of claim 7, further comprising:
   assigning a tunnel end point identifier (TEID) to the end user for the communication session, the TEID reflecting a selected communication tunnel to be used during the communication session.

10. The method of claim 7, further comprising:
    changing an end point address associated with a selected one of a plurality of network nodes in order to execute a handoff for the communications session associated with the end user.

11. A system for communicating data in a network environment, comprising:
    a loadbalancer operable to receive a request from an end user for a communications link provided by a gateway support node, wherein the gateway support node communicates a response to the end user in order to establish a communication session, and wherein port-level filtering is invoked after the response such that separate data and signal pathways are established between the end user and the gateway support node, the gateway support node being operable to initiate one or more tunnels on behalf of the end user in order to establish the communication session; and
    first and second policy based routers each coupled to the loadbalancer, wherein the policy based routers are operable to facilitate propagation of information flowing through the data pathway such that the loadbalancer does not receive information propagating through the data pathway.

12. The system of claim 11, wherein a tunnel end point identifier (TEID) is assigned to the end user for the communication session, the TEID reflecting a selected communication tunnel to be used during the communication session.

13. The system of claim 11, wherein the request includes a virtual address provisioned to the loadbalancer and operable to route the request from the end user to the loadbalancer.

14. The system of claim 11, wherein the loadbalancer is further operable to change an end point address associated with a selected one of a plurality of gateway support nodes in order to execute a handoff associated with the end user.

15. A computer readable medium having code for communicating data in a network environment, the code operable to:
    receive a request from an end user for a communications link, the request being used to initiate a communication session;
    receive a response communicated to the end user that may establish the communication session, the response being generated by a network node that was selected as a result of a loadbalancing decision;
    invoke port-level filtering for the communication session after the response such that separate data and signal pathways are established for selected information associated with the communication session; and
    use first and second policy based routers to facilitate propagation of information flowing through the data pathway such that an associated loadbalancer does not receive information propagating through the data pathway.

16. The code of claim 15, further operable to:
    initiate one or more tunnels on behalf of the end user in order to establish the communication session.

17. The code of claim 15, further operable to:

assign a tunnel end point identifier (TEID) to the end user for the communication session, the TEID reflecting a communication tunnel node to be used during the communication session.

18. A system for communicating data in a network environment, comprising:

means for receiving a request from an end user for a communications link, the request being used to initiate a communication session;

means for receiving a response communicated to the end user that may establish the communication session, the response being generated by a network node that was selected as a result of a loadbalancing decision;

means for invoking port-level filtering for the communication session after the response such that separate data and signal pathways are established for selected information associated with the communication session; and means for using first and second policy based routers to facilitate propagation of information flowing through the data pathway such that an associated loadbalancer does not receive information propagating through the data pathway.

19. The system of claim 18, further comprising:

means for initiating one or more tunnels on behalf of the end user in order to establish the communication session.

20. The system of claim 18, further comprising:

means for assigning a tunnel end point identifier (TEID) to the end user for the communication session, the TEID reflecting a selected communication tunnel to be used during the communication session.

* * * * *